No. 615,961. Patented Dec. 13, 1898.
A. DOYLE.
STEERING GEAR FOR BICYCLES.
(Application filed July 28, 1897.)
(No Model.)
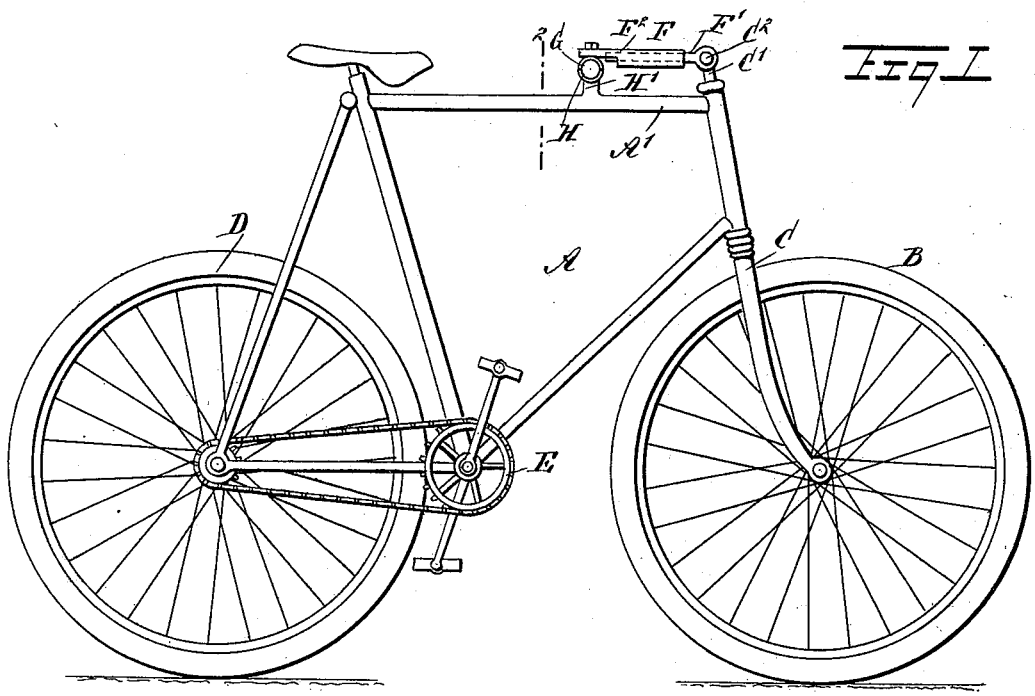
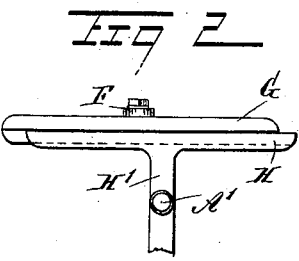
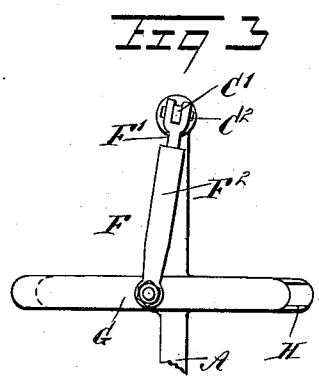
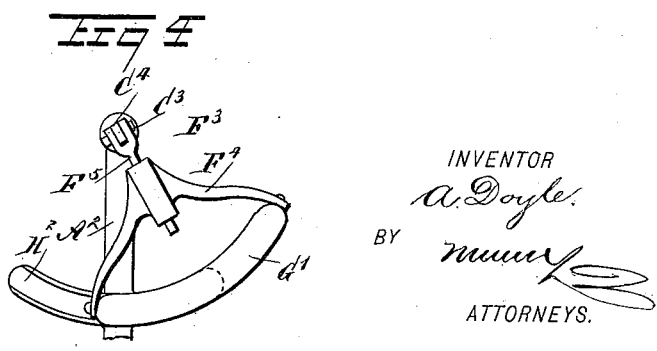
WITNESSES:
H. Walker
Theo. G. Hoster
INVENTOR
A. Doyle
BY
ATTORNEYS.
THE NORRIS PETERS CO., PHOTO-LITHO., WASHINGTON, D. C.

UNITED STATES PATENT OFFICE.

ARTHUR DOYLE, OF SEATTLE, WASHINGTON.

STEERING-GEAR FOR BICYCLES.

SPECIFICATION forming part of Letters Patent No. 615,961, dated December 13, 1898.

Application filed July 28, 1897. Serial No. 646,185. (No model.)

*To all whom it may concern:*

Be it known that I, ARTHUR DOYLE, of Seattle, in the county of King and State of Washington, have invented a new and Improved Steering-Gear for Bicycles, of which the following is a full, clear, and exact description.

The object of the invention is to provide a new and improved steering-gear for bicycles which is simple and durable in construction, very effective in operation, not liable to get out of order, and arranged to permit the rider to conveniently manipulate the steering-gear with one hand.

The invention consists of novel features and parts and combinations of the same, as will be described hereinafter and then pointed out in the claim.

Reference is to be had to the accompanying drawings, forming a part of this specification, in which similar characters of reference indicate corresponding parts in all the figures.

Figure 1 is a side elevation of the improvement as applied. Fig. 2 is an enlarged transverse section of the same on the line 2 2 of Fig. 1. Fig. 3 is an enlarged plan view of the same, and Fig. 4 is a similar view of a modified form of the improvement.

The bicycle on which the improvement is applied is provided with the usual frame A, the front or steering wheel B, journaled in the fork C, and the rear or drive wheel D, actuated by a suitable pedal mechanism E.

On the upper end of the steering-post $C'$ is arranged a transverse pivot-pin $C^2$, engaged by one end of a horizontally-extending link F, pivotally connected with a slide G, extending transversely and mounted to slide in a bearing or guide H, secured by a downwardly-extending arm $H'$ to the upper brace $A'$ of the bicycle-frame. The link F is preferably made in two parts $F'$ $F^2$, telescoping one into the other, so that on shifting the slide G transversely in its bearings the steering-post $C'$ and fork C are turned in the steering-head of the frame to turn the wheel B to the right or left, according to the direction in which the slide G is moved. By the operator taking hold of both the slide G and its bearing H the slide can be readily clamped in position, so as to prevent the steering-post $C'$ from turning and to hold the steering-wheel B in the desired direction.

As shown in Fig. 4, the slide $G'$ is made segmental to slide on a correspondingly-shaped bearing $H^2$, supported from the upper brace $A^2$ of the bicycle-frame, and on the ends of the said slide $G'$ is secured the arm $F^4$, forming, with the part $F^5$, a link $F^3$, extending from the slide $G'$ to the post $C^4$ of the bicycle-fork. The part $F^5$ is preferably fitted to slide in the arm $F^4$, so that any unevenness incident to the jarring of the bicycle will not cause the slide $G'$ to bind in its bearing $H^2$.

It is understood that when the slide G has been shifted to turn the wheel in a desired direction to the right or to the left the operator by clamping both the slide and the bearing can readily lock the slide in place until the turn has been made.

Having thus fully described my invention, I claim as new and desire to secure by Letters Patent—

A steering-gear for bicycles, comprising a transverse fixed bearing, a slide mounted to slide thereon, and a link pivotally connected with the said slide, and attached to the fork of the bicycle, the said link being made in telescoping parts, substantially as shown and described.

ARTHUR DOYLE.

Witnesses:
W. PARRY SMITH,
HETTIE SMITH.